United States Patent [19]

Duroux

[11] Patent Number: 4,900,142
[45] Date of Patent: Feb. 13, 1990

[54] REMOTELY CONTROLLED REAR VIEW MIRROR

[75] Inventor: Bernard Duroux, Garancieres, France

[73] Assignee: Britax (Geco) SA, France

[21] Appl. No.: 301,660

[22] Filed: Jan. 25, 1989

[30] Foreign Application Priority Data

Jan. 29, 1988 [GB] United Kingdom ............. 8802060

[51] Int. Cl.⁴ .................... B60R 1/06; G02B 7/18
[52] U.S. Cl. ............................................. 350/634
[58] Field of Search ............................. 350/634–637

[56] References Cited

U.S. PATENT DOCUMENTS 4,678,295  7/1987  Fisher .............................. 350/634
4,768,871  9/1988  Mittlehauser ................... 350/634

FOREIGN PATENT DOCUMENTS 0060362  9/1982  European Pat. Off. .
0269081  1/1988  European Pat. Off. .
3416656  5/1984  Fed. Rep. of Germany .

Primary Examiner—Bruce Y. Arnold
Attorney, Agent, or Firm—Davis, Bojold & Streck

[57] ABSTRACT

A remotely controlled rear view mirror assembly for a motor vehicle consists of a base adapted to be mounted on a vehicle body, a casing mouonted on the base and a reflective member mounted in the casing for angular movement about two mutually perpendicular axes. A control member is mounted on the base so as to engage with three elongate members each of which has two end portions of cross section adapted to resist bending about first and second mutually perpendicular transverse directions, interconnected by an intermediate portion having a cross-section adapted to permit bending in the first transverse direction. Guide means mounted in the casing are arranged to direct one end of each elongate member into abutment with a surface of the reflective member facing the interior of the casing, and to direct the other end of each elongate member through an opening in the casing facing the base so as to abut against the control member.

10 Claims, 2 Drawing Sheets

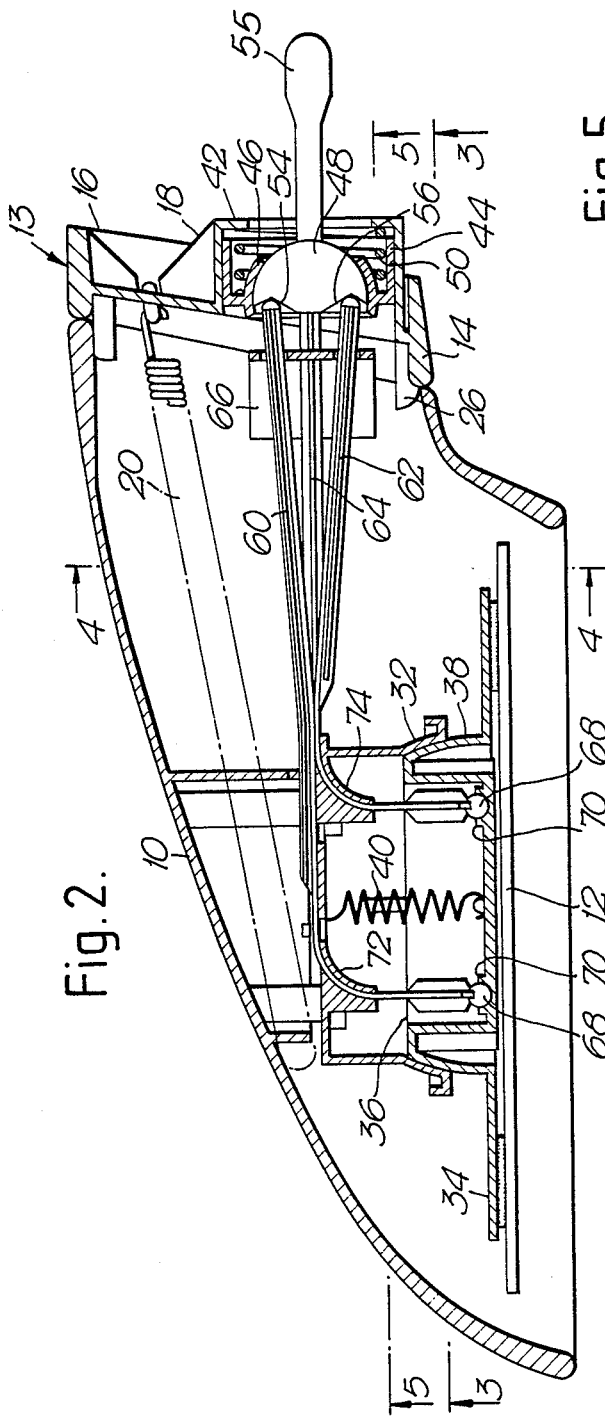
Fig. 2.
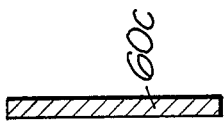
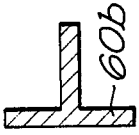
Fig. 5.
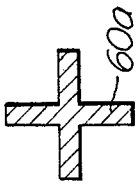
Fig. 4.
Fig. 3.

REMOTELY CONTROLLED REAR VIEW MIRROR

This invention relates to a remotely controlled rear view mirror assembly for a motor vehicle of the type comprising a base adapted to be mounted on a vehicle body, a casing mounted on the base, a reflective member mounted in the casing for angular movement relative to the casing about two mutually perpendicular axes, a control member on the base and two thrust-transmitting units responsive to the control member for selectively applying a thrust to the reflective member at two locations, each of which is offset relative to a respective one of the two mutually perpendicular axes.

In a known mirror assembly of this type, each thrust-transmitting unit comprises a Bowden cable. However, this type of mirror is subject to a number of disadvantages. For example, if the Bowden cable is made of metal, it is subject to corrosion. In addition, if the casing is to be pivotable relative to the base so as to be displaceable when subject to impact, each cable has to be of sufficient length to permit such pivoting movement and there has to be sufficient space within the casing and/or the base to accommodate this additional length of cable.

According to the invention, in a rear view mirror assembly of the foregoing type, each thrust-transmitting unit comprises an elongate member having two end portions of cross section adapted to resist bending about first and second mutually perpendicular transverse directions, said end portions being interconnected by an intermediate portion having a cross-section adapted to permit bending in the first transverse direction, and guide means mounted in the casing and arranged to direct one end of each elongate member into abutment with a surface of the reflective member facing the interior of the casing, and to direct the other end of each elongate member through an opening in the casing facing the base so as to abut against the control member.

In one form of the invention, each elongate member comprises a strip of which the intermediate portion is flat and which has a flange extending from each end portion in said first transverse direction.

Preferably three thrust-transmitting units are arranged to engage with the reflective member at three locations symmetrically located about the point of intersection of the two axes about which the reflective member is moveable, and the control member comprises a part spherical member engaging in a complementary socket in the base and having a non-spherical surface against which an end each elongate member abuts so that angular movement of the control member in its socket causes corresponding angular movement of the reflective member.

An embodiment of the invention will now be described, by way of example, with reference to the accompanying drawings in which:

FIG. 2 is a cross-sectional view taken on the line 2—2 in FIG. 1;

Figure 1:
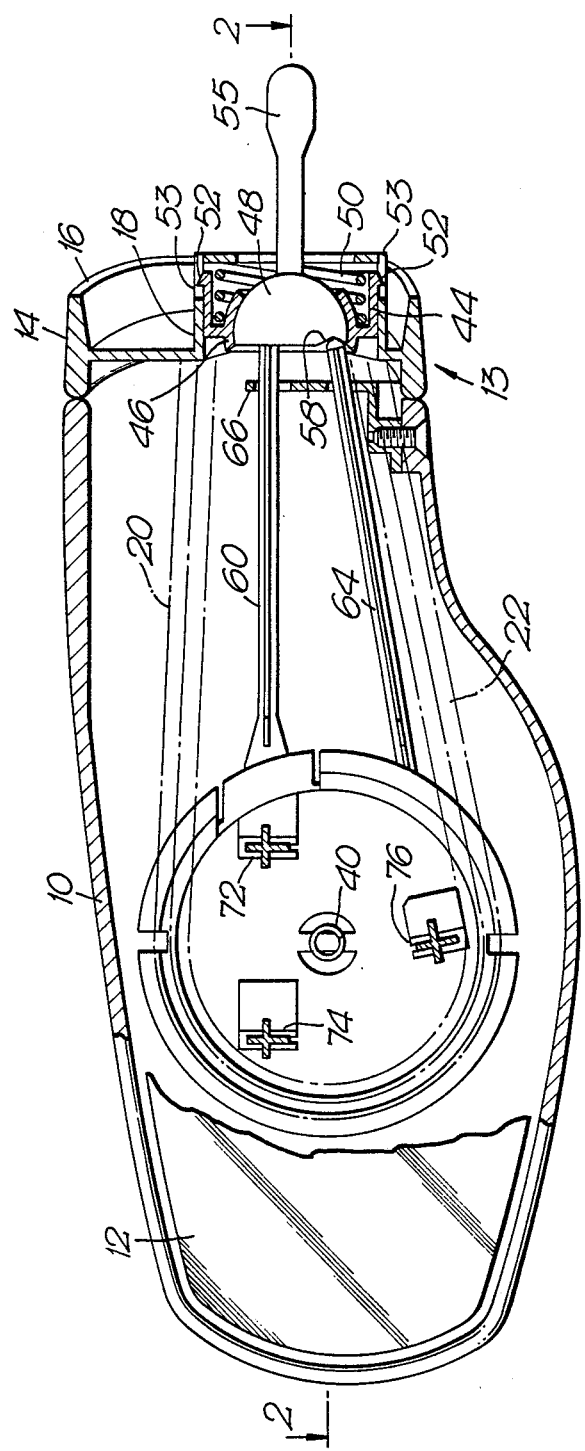
FIG. 1 is a partially broken-away elevational view of a rear view mirror assembly in accordance with the invention, taken from the direction from which the mirror is viewed in use.

FIGS. 3, 4 and 5 are cross-sectional views of one of the thrust-transmitting members of the rear view mirror assembly shown in FIG. 2, taken on the lines 3—3, 4—4, and 5—5 respectively.

Referring to FIGS. 1 and 2, an exterior rear view mirror assembly has a casing 10 containing a reflective member 12 and mounted on a base 13 which has a peripheral flange 14, the edge of which is shaped to conform to the surface of a vehicle body (not shown), and a central boss 16 arranged to project beyond the edge of the flange 14 towards the interior of such a vehicle. The casing 10 is held in position on the base 13 by a pair of tension springs 20 and 22. If the casing 10 is subject to impact from the side from which the reflective member 12 is visible, it can pivot away from the impact about a point of engagement with its edge and a projection 24 on the base 14. Similarly, if the casing 10 is subject to impact from the opposite direction, it can pivot about a point of engagement of its edge with a projection 26 on the other side of the base 14.

Referring to FIG. 2, a cup-like support member 30 is secured to the interior of the casing 10 with an open end facing the back of the reflective member 12. The edge reasons of the support member 30 are flared outwardly so as to form a concave socket 32. The reflective member 12 is mounted on a mirror carrier 34 which has an annular flange 36 on the opposite side to the reflective member 12. The outer surface 38 of the flange 36 is of part-spherical shape and dimensioned to engage in the socket 32. A tension spring 40 extends from the centre of the support member 30 to the centre of the part of the surface of the mirror carrier 34 bounded by the flange 38 so as to hold the part spherical surface 38 in engagement with the socket 32. Consequently the mirror carrier 34 can pivot about two mutually perpendicular axes lying parallel to the surface of the reflective member 12 and intersecting at the centre of curvature of the part spherical surface 38, thereby allowing adjustment of the orientation of the reflective member 12 relative to the casing 10.

The hollow boss 18 on the base 13 has a radially inwardly extending flange 42 on the end closer to the interior of the vehicle. A socket carrier 44 is dimensioned to be a sliding fit in the boss 18 and has a part-spherical concave socket portion 46 in which a part-spherical convex member 48 is received as a snap-fit. A compression spring 50 engages between the flange 42 and the socket carrier 44 so as to urge the latter towards the casing 10 but this movement is limited by projections 52 (FIG. 1) on the socket carrier 44 which engage in slots 53 in the side walls of the boss 18. The projections 52 preferably have chamfered faces directed towards the flange 42, the boss 18 and socket carrier 44 being made of a sufficiently resilient material to allow these projections 52 to be snapped into their respective slots 53 during assembly.

The part-spherical convex member 48 has an operating lever 55 projecting into the interior of the vehicle. The opposite face thereof is substantially flat but has three recesses 54, 56 and 58 symmetrically spaced around its centre. Three pusher blades 60, 62 and 64 extend through respective holes in a bracket 66 mounted on the interior of the casing 10 adjacent to the base 14 so as to engage in respective recesses 54, 56 and 58 in the part spherical member 48. The other end of each of the blades 60, 62 and 64 carries a respective spherical formation 68 which is a snap-fit in a respective socket 70 on the back face of the mirror carrier 34, the three sockets 70 being symmetrically disposed around the centre of curvature of the part-spherical surface 38 of the annular projection 36 thereon.

In the vicinity of the mirror carrier 34, the pusher blades 60, 62 and 64 are of cross-shaped cross-section 60a as shown in FIG. 3. Between the part-spherical member 48 in the boss 18 and the support member 30, the three pusher blades 60, 62 and 64 are of T-shaped cross-section 60b as shown in FIG. 4. Consequently, the pusher blades resist bending in any direction transverse to their length in these regions. However, where the pusher blades 60, 62 and 64 pass through the walls of the support member 30, they are of flat strip-like cross-section 60c, as shown in FIG. 5, so as to be bendable in the direction of their minimum dimension. A respective guide channel 72, 74, 76, is provided where each of the pusher blades passes through the wall of the support member 30 so as to guide it through an angle of approximately 90 deg.

In use, when it is desired to adjust the orientation of the reflective member 12, the lever 52 is pivoted about the centre of the convex member 48, thus pushing on at least one of the pusher blades 60, 62 and 64 and allowing the other blade or blades to move towards the interior of the vehicle. The resulting movement of the other ends of the pusher blades 60, 62, and 64 produces a corresponding movement of the mirror carrier 34. The bendable central region of each pusher blade 60, 62, 64 allows the necessary flexing movement as it travels along its corresponding guide channel 72, 74, and 76.

If the casing 10 is displaced from its normal position as a result of impact, the ends of the pusher blades 60, 62 and 64 disengage from their respective recesses 54, 56 and 58 in the part-spherical member 48 and reingage therein when the casing 10 is returned to its normal position. Normally there will be sufficient friction between the convex member 48 and its socket 46 to retain the lever 55 in its preset position; however, if it has moved from such position, the pusher blades 60, 62 and 64 restore it to the position which it occupied at the time of disengagement, rather than causing inadvertent alteration of the orientation of the mirror carrier 34, because the friction between the part-spherical surface 38 thereon and the flange 32 is greater than the friction between the part-spherical member 48 carrying the operating lever 55 and its socket 46.

It is not essential for the spherical formations 68 on the ends of the pusher blades 60, 62 and 64 to be a snap-fit in their respective sockets 70; it is sufficient for them to abut against the back of the mirror carrier. However, in this case, it is necessary either to replace the sockets 70 with sufficiently flared sockets to ensure that the pusher blades re-engage at their correct locations in the event of their becoming disengaged, or to provide guidance equivalent to the guidance provided by the bracket 66.

As a further alternative, the three pusher blades 60, 62 and 64 could be formed as a single integral plastics moulding connected to the mirror carrier 34 by integral plastic hinges.

I claim:

1. A remotely controlled rear view mirror assembly for a motor vehicle comprising a base adapted to be mounted on a vehicle body, a casing mounted on the base, a reflective member mounted in the casing for angular movement relative to the casing about two mutually perpendicular axes, a control member on the base and two thrust-transmitting units responsive to the control member for selectively applying a thrust to the reflective member at two locations, each of which is offset relative to a respective one of the two mutually perpendicular axes, wherein each thrust-transmitting unit comprises guide means mounted in the casing and an elongate member slidably mounted in the guide means, the elongate member having two end portions of cross section adapted to resist bending about first and second mutually perpendicular transverse directions, said end portions being interconnected by an intermediate portion having a cross-section adapted to permit bending in the first transverse direction, and the guide means being arranged to direct one end of each elongate member into abutment with a surface of the reflective member facing the interior of the casing and to direct the other end of each elongate member through an opening in the casing facing the base so as to abut against the control member.

2. A rear view mirror assembly according to claim 1, wherein each elongate member comprises a strip of which the intermediate portion is flat and which has a flange extending from each end portion in said first transverse direction.

3. A rear view mirror assembly according to claim 2, wherein three- thrust-transmitting units are arranged to engage with the reflective member at three locations symmetrically located about the point of intersection of the two axes about which the reflective member is moveable, and wherein the control member comprises a part spherical member engaging in a complementary socket in the base and having a non-spherical surface against which an end of each elongate member abuts so that angular movement of the control member in its socket causes corresponding angular movement of the reflective member.

4. A rear view mirror assembly according to claim 3, wherein the reflective member has a convex part-spherical flange centered on the point of intersection of the axes about which it is moveable, said flange being held in engagement with a concave part-spherical socket in the casing by a tension spring.

5. A rear view mirror assembly according to claim 4, wherein the socket for the control member is mounted on resilient means for urging the control member into engagement with the thrust-transmitting units.

6. A rear view mirror assembly according to claim 3, wherein the socket for the control member is mounted on resilient means for urging the control member into engagement with the thrust-transmitting units.

7. A rear view mirror assembly according to claim 1, wherein three thrust-transmitting units are arranged to engage with the reflective member at three locations symmetrically located about the point of intersection of the two axes about which the reflective member is moveable, .and the control member comprises a part spherical member engaging in a complementary socket in the base and having a non-spherical surface against which an end each elongate member abuts so that angular movement of the control member in its socket causes corresponding angular movement of the reflective member.

8. A rear view mirror assembly according to claim 7, wherein the reflective member has a convex part-spherical flange centred on the point of intersection of the axes about which it is moveable, said flange being held in engagement with a concave part-spherical socket in the casing by a tension spring.

9. A rear view mirror assembly according to claim 8, wherein the socket for the control member is mounted on resilient means for urging the control member into engagement with the thrust-transmitting units.

10. A rear view mirror assembly according to claim 7, wherein the socket for the control member is mounted on resilient means for urging the control member into engagement with the thrust-transmitting units.

* * * * *